United States Patent [19]
Marchand

[11] 3,778,831
[45] Dec. 11, 1973

[54] COMPATIBLE DOUBLE PRECISION DOPPLER OMNIDIRECTIONAL BEARING SYSTEM

[76] Inventor: Nathan Marchand, 311 Riversville Rd., Greenwich, Conn. 06830

[22] Filed: Apr. 7, 1971

[21] Appl. No.: 132,100

[52] U.S. Cl.................... 343/106 D, 343/113 DE
[51] Int. Cl................................................ G01s 1/38
[58] Field of Search ................ 343/106 D, 113 DE, 343/876

[56] References Cited
UNITED STATES PATENTS

| | | | |
|---|---|---|---|
| 3,287,727 | 11/1966 | Earp | 343/113 DE |
| 3,226,718 | 12/1965 | Earp | 343/106 D |
| 3,386,097 | 5/1968 | Richter et al. | 343/113 DE |
| 2,686,910 | 8/1954 | Hirsch | 343/106 D |

Primary Examiner—Benjamin A. Borchelt
Assistant Examiner—Denis H. McCabe
Attorney—Alfred E. Miller

[57] ABSTRACT

A circular antenna array has a first antenna and second and third antennas or a first antenna and two pairs of antennas arranged around the first antenna on a circular perimeter of which the first antenna is the center of the circular array. A frequency modulation is generated in the signals associated with the second and third antennas or the two pairs of antennas characteristic of a rotational condition of the second and third antennas or the two pairs of antennas on the perimeter at a low frequency in a manner whereby the second and third antennas or two pairs of antennas are rotated in opposite directions around the perimeter to provide a phase difference in electrical degrees in the modulation of the signals which are radiated which is double the actual displacement in azimuth degrees. A signal radiated from the center antenna is used as a reference to eliminate the 180° ambiguity.

10 Claims, 6 Drawing Figures

COMPATIBLE DOUBLE PRECISION DOPPLER OMNIDIRECTIONAL BEARING SYSTEM

DESCRIPTION OF THE INVENTION

The present invention relates to a Doppler omnidirectional bearing system. More particularly, the invention relates to a wide aperture compatible double precision Doppler type omnidirectional beacon system which is suitable for achieving a higher siting independence and stability of direction determination.

Hereinafter, VOR is intended to mean a very high frequency omnirange and DPDVOR is a double precision Doppler very high frequency omnirange.

With conventional types of VOR beacons, operating with a small aperture antenna system, the greatest problem in practice is the choice of a proper site, due to considerable bearing errors or imperfections caused by multipath propagation. As is well known, such imperfections can be avoided by the employment of wide aperture systems.

A wide aperture Doppler type VOR beacon system is known which is suitable for cooperating with conventional VOR receivers. It consists of a system of circularly arranged antennas (circular antenna array) with a carrier antenna located at the center of the circle. The feeding of the entire antenna system is effected in such a way that the carrier antenna transmits about 90 percent of the energy of the VOR transmitter, while the remaining 10 percent of the energy is transmitted via the circular antenna array which is successively fed via a switch. The RF energy, which is transmitted by the carrier antenna, in order to comply with the data prescribed by ICAO standards at its reception, is displaced in frequency by an amount of 9960 cps with respect to energy transmitted by the circular antennas. The energy is radiated by the center antenna, and the carrier is amplitude modulated with a frequency of 30 cps which, in this particular case, represents the phase reference signal. The frequency signal of 9960 cps corresponds to the frequency of the subcarrier for the reference signal as prescribed with respect to the conventional VOR beacons.

As is well known in the case of conventional VOR beacons, the reference signal is transmitted omnidirectionally and is in effect a frequency modulation of a subcarrier frequency of 9960 cps with 30 cps which adheres to the prescribed ICAO standard frequency deviation of 480 cps. The directional modulation is produced at the receiving end due to the rotation of a cardioid pattern at the transmitting end, as an amplitude modulation of the received RF energy.

Accordingly, in the aforedescribed known Doppler type VOR beacon, the reference signal is transmitted as an amplitude modulation of the energy transmitted by the carrier antenna. The directional modulation which is realized at a remote receiving point, results from the actual or simulated antenna rotation (cyclical connection) around a circular path as carried out at the transmitting end, as known, exists at the receiving end as a frequency modulation with the gyration frequency of 9960 cps produced by a beat between the two received RF carrier wave frequencies.

A circular rotation of a radiation source is electronically simulated by sequentially feeding RF energy into antennas spaced around a circle. The time period for one complete rotation of the radiating source is 1/30 of a second and the diameter of the circle is chosen so that the frequency deviation is ± 480 cps, as hereinbefore described. As described, the simulation of the rotation of a single antenna and the displacement of the frequency so that it becomes the 9960 cps subcarrier results in a completely compatible VOR system. The Doppler system may be further improved by using properly phased double sidebands, which are the ± 9960 cps subcarriers. The 30 cps amplitude modulated signal is thus radiated in an omnidirectional antenna as a reference and the 9960 cps center frequency provided in the AM detector contains the 30 cps directional signal as an FM signal with a deviation of 480 cps about the 9960 cps signal. This signal is completely compatible with the standard VOR signal, as described. Pairs of antennas may be provided substantially diametrically opposite each other for each subcarrier.

It has been stated that proper double sideband operation will theoretically reduce the system error almost to zero in H. Popp, "The Doppler VOR - An Improved and Compatible VHF Omnirange Navigation System Radio Technical Commission for Aeronautics", SC-121 Briefing Paper Page 1, July 20, 1970. This assumes that the reference signal is perfect.

In order to comply with the recommendations as laid down by ICAO standards with respect to VOR beacons it is further necessary, in the case of the fixed gyration frequency of 30 cps and the likewise fixed frequency deviation of 480 cps to make the diameter of the antenna circle correspondingly large. The diameter of the antenna should correspond to about five operating wavelengths because the frequency deviation is proportional to the diameter of the antenna circle and to the gyration frequency, or to the velocity of switching as achieved on the circular path. In other words, the frequency deviation is proportional to the velocity of the motion of a single antenna on a circular path as simulated by the cyclical commutation.

The FAA has been conducting an extensive program leading to the development of a precision omnirange system capable of meeting future ATC requirements. E. J. Ferrari et al, "Development of a Compatible Precision Doppler VOR System," SC-121 Briefing Paper. The objectives are to improve course quality, particularly in high density terminal areas, to provide increased system accuracy to permit reduced route widths in the vicinity of the terminals, and to maintain complete compatibility with existing airborne receivers.

Although improvement in the quality of the variable signal can be realized by using double sideband VOR, a major source of error is the corruption of the AM reference by unwanted 30 cps components. An FM/FM precision reference may be utilized to obtain a VOR system accuracy of ± 2°. The 30 cps reference signal is frequency modulated on a 6.5 kcs subcarrier with a frequency deviation of ± 480 cps to match the deviation of the 9.96 kcs signal. The 6.5 kcs subcarrier frequency modulates the main carrier which is radiated omnidirectionally with a deviation of 0.3 radian. Compatibility is maintained by utilization of both the conventional AM reference and the FM/FM reference.

The 6.5 kcs signal in the PDVOR does not carry any more information, but is a substitute for the standard AM reference. This system may be improved in accordance with the invention as will be described in particular hereinafter. The 6.5 kcs signal or similar subcarrier may be generated by using the wide aperture Doppler antenna array.

The principal object of the invention is to provide a new and improved omnidirectional bearing system.

An object of the invention is to provide an omnidirectional bearing system which removes the effect of reflections and spurious interference.

Another object of the invention is to provide an omnidirectional bearing system which doubles the number of electrical degrees change for each azimuth degree change.

Another object of the invention is to provide an omnidirectional bearing system which is as compatible as a system which requires the use of a new reference signal in the airborne equipment and therefore requires modification of the airborne unit.

Another object of the invention is to provide an omnidirectional bearing system which reduces instrument error by one half and eliminates the use of any omnidirectional radiation in the determination of angle.

Another object of the invention is to provide an omnidirectional bearing system which utilizes the wide aperture array for both signals which are compared and in which the omnidirectional signal is used only to remove the 180° ambiguity.

Another object of the invention is to provide an omnidirectional bearing system utilizing a wide aperture array which requires no changes in the Doppler antenna array.

The present invention is a radio bearing system using the Doppler principle, and employing an actual or simulated circular antenna motion. At the transmitting end (beacon) are provided a carrier antenna and two antennas, or two pairs of antennas, rotating in opposite direction to each other and which are simulated in a manner whereby the carrier antenna transmits a high frequency first carrier frequency which is amplitude modulated with a low frequency phase reference signal synchronized with the circular motion, for example, 30 cps reference phase signal, while the oppositely rotating antennas located on the circular path each transmit a second and third carrier frequency lying at an equally spaced relation, for example, a 9960 cps subcarrier frequency and a 6500 cps subcarrier frequency displaced from the first carrier frequency. The phases of the carrier frequencies are chosen to correspond to those of sidebands which would be obtained from either amplitude or frequency modulation of the first carrier frequency with a corresponding auxiliary carrier frequency. At the receiving end there are provided means for receiving the different carrier frequencies, for obtaining the auxiliary carrier frequencies and the reference phase signal, and for obtaining, by way of a frequency demodulation of the auxiliary carrier frequencies, AC voltages, the phases of which with respect to each other and to the reference phase signal, indicates the direction from or to the beacon.

Analogously, the principles of the system of the invention may also be applied to a receiving system. That is, the same principles may also be utilized with a direction finder.

Still another object of the invention is to provide an omnidirectional radio bearing system using the Doppler principle and employing an actual or simulated circular antenna motion for employment with a direction finder, whereby at the transmitting end (object of direction finding) there is transmitted a high frequency carrier wave without any directional information. The arrangement according to the invention comprises at the receiving end (direction finder) a carrier antenna located at the center of the array, and further the circular motion of the two antennas or two pairs of antennas in opposite directions to each other on a diameter, is realized or simulated. The carrier wave energy is received by the carrier antenna, and is directly fed to the receiver inlet. The carrier energies which are received by the two antennas arranged on the circular path, however, are modulated separately and without carriers, with auxiliary carrier frequencies of, for example, one displaced from the carrier by 9960 cps and the other displaced by 6500 cps from the carrier, and the resulting sidebands of the first order are fed to the receiver input. There is obtained subsequent to the amplitude demodulation auxiliary carrier frequencies from which, by a frequency demodulation, there is derived the AC voltages containing the directional information, while the reference phase signal to remove any 180° ambiguity is obtained in the manner as known per se, from a generator which is synchronized with the antenna rotation frequency.

In this type of Doppler beacon system, or a direction finder respectively, some considerable advantages will result when pairs of antennas for double sidebands are used. In a double sideband DVOR beacon, at a receiver located at a remote receiving point from such omnidirectional beacon this kind of transmission acts like the transmission of a modulated carrier wave transmitted by a single antenna, as is the case with a normal broadcasting transmitter. Thus, there is practically received a carrier wave which is modulated by the subcarrier without any non-linear distortion, whereas in the conventional and proposed types of systems, the low frequency is produced by a beat of two RF carrier frequencies resulting in distortion. Thus there is an advantage to using double sidebands in the DPVOR.

A further advantage of the transmitter end is that the antennas of the circular array can be fed with a very small portion of the energy which meets the requirements laid down by ICAO standards.

Since there is provided a carrier antenna adapted to transmit the carrier wave which is amplitude modulated with the reference signal, and in addition thereto, there are provided two antennas or two pairs of antennas actually or apparently rotating on the circular path, there is produced at the remote receiving point a double site diversity, such that the siting independency is still further increased. Furthermore, in accordance with the invention, the simulated rotation of the two antennas is in opposition, so that the subcarrier signal at one antenna is rotated in a clockwise direction and the subcarrier signal at the other antenna is rotated in a counterclockwise direction. This results in the aforedescribed advantages of doubling the electrical degrees of phase differences and thus the reduction of instrument error by one half, elimination of the use of any omnidirectional radiation in the determination of angle, utilization of the wide aperture array for both signals which are compared, utilization of the omnidirectional signal only to remove the 180° ambiguity and maintaining the equipment the same with the necessity for changing only the Doppler signal distributor.

One of the objects of this invention is to design a radio beacon which complies with the requirements demanded by ICAO standards in order that the conventional receivers intended for cooperation with the VOR beacon systems can be used without having to be altered. Naturally, no need for complying with these standards is necessary in the case of a direction finder.

The carrier and second and third carrier energies as fed to the receiver input can be in such an energy ratio that the modulation indices up to 100 percent are realized. With respect to a direction finder this results in an increase in sensitivity.

In accordance with the present invention, in an omnidirectional radio bearing system utilizing the Doppler principle, an antenna system comprises a circular antenna including a first antenna and second and third antennas or two pairs of antennas rotating in an opposite direction to each other and around the first antenna on a circular perimeter of which the first antenna constitutes the center of the circular array. Rotating means generates a frequency modulation in the signals associated with the second and third antennas or pairs of antennas characteristic of a rotational condition of the second and third antennas or pair of antennas on the perimeter at a low frequency in a manner whereby the second and third antennas or pairs of antennas are rotated in opposite directions around the perimeter to provide a phase difference in electrical degrees in the modulation of the radiated signal which is double the actual displacement in azimuth degrees. The signals associated with the first antenna are un-affected by the frequency modulation.

The second antenna or pair of antennas is, for example, a 9960 cps subcarrier antenna which is rotated at 30 cps in one of a clockwise and counterclockwise direction. The third antenna or pair of antennas is, for example, a 6500 cps subcarrier antenna which is rotated at 30 cps in the other of a clockwise and counterclockwise direction.

When the second antenna is rotated in a counterclockwise direction so that the 30 cps signal modulated on the 9960 cps subcarrier arrives earlier in phase when the direction of reception moves in a clockwise direction. The third antenna is rotated in a clockwise direction so that the 30 cps signal modulated on the 6500 cps subcarrier arrives later in phase.

The size of the circular array can be chosen so that the Doppler signal at the second antenna is 9960 ± 480 cps and the Doppler signal at the third antenna is 6500 ± 480 cps. The phase difference in electrical degrees between the two 30 cycle modulating frequencies which are radiated is double the actual displacement in azimuth degrees. One signal advances in phase and the other signal is retarded equally in phase with azimuth.

Figure 1:
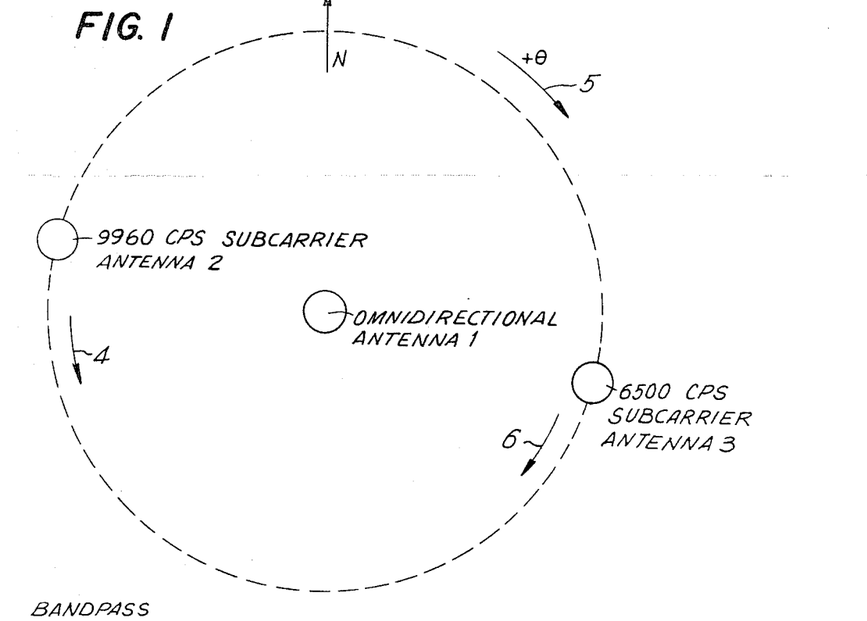
FIG. 1 is a schematic diagram illustrating the principle of operation of the present invention.

In order that the invention may be readily carried into effect, it will now be described with reference to the accompanying drawings, wherein:

FIG. 1 illustrates the basic principle of operation of the invention. Since simulated rotation by switching is similar to actual rotation of the antenna, the system is described as though the antennas actually rotate.

The second antenna 2 is a 9960 cps subcarrier antenna which, in accordance with the invention, is rotated at 30 cps in a counterclockwise direction, for example, as indicated by an arrow 4. This means that the 30 cps signal modulated on the 9960 cps subcarrier will arrive earlier in phase as the direction of reception moves in a clockwise direction + $\theta$ from North, as indicated by an arrow 5. When referred to the 30 cycle AM signal radiated on the omnidirectional antenna 1, the phase change will be equal to the azimuth change in degrees.

The third antenna 3 is a 6500 cps subcarrier antenna which, in accordance with the invention, is rotated at 30 cps in a clockwise direction, for example, as indicated by an arrow 6. This means that the 30 cps signal modulated on the 6500 cps subcarrier will arrive later in phase as the direction of reception moves in a clockwise direction + $\theta$. Again, when referred to the 30 cps AM signal radiated at the first omnidirectional antenna 1, the phase change will be equal to the azimuth change in degrees.

If the 30 cycle modulation of the two Doppler signals 9960 ± 480 cps and 6500 ± 480 cps are compared to one another, the phase difference in electrical degrees is double the actual displacement in azimuth degrees, since one signal advances in phase and the other signal is retarded equally in phase with azimuth. Since the signals being compared are still 30 cps signals, no change in basic equipment design is necessary to adapt the present VOR receiver to DPVOR. There is no basic change in equipment when the receiver is used with regular VOR and a slight change for DPVOR. Thus, it should be apparent that the present construction results in a system which provides an accurate fine indication means of the direction of reception by comparing the two received frequency modulated Doppler signals.

A comparison of the 30 cps carried on the 9960 cps subcarrier with the 30 cps AM signal eliminates the 180° ambiguity obtained when the 30 cps carried on the 6500 cps subcarrier is compared with the 30 cps on the 9960 cps subcarrier.

A subcarrier around 6000 cps is preferable, because it will not interfere with either the 30 cps, voice or the 9960 cycle modulations presently used. The ambiguity may be manually or automatically eliminated by switching from the AM reference to the new Doppler signal. The AM signal is merely utilized to remove the 180° ambiguity and is no longer involved in the accuracy when the 6 kps signal is utilized.

The same principles may be applied for double sideband, except that two pairs of subcarriers are rotated. When the proper phase relationships are selected, the approximately 6000 cps subcarrier can provide frequency modulation of the carrier and the 9960 cps subcarrier can provide amplitude modulation of the carrier. Any combination of AM or FM may be utilized.

A single subcarrier or single sideband, of course, provides both AM and FM of the carrier.

Figure 2:
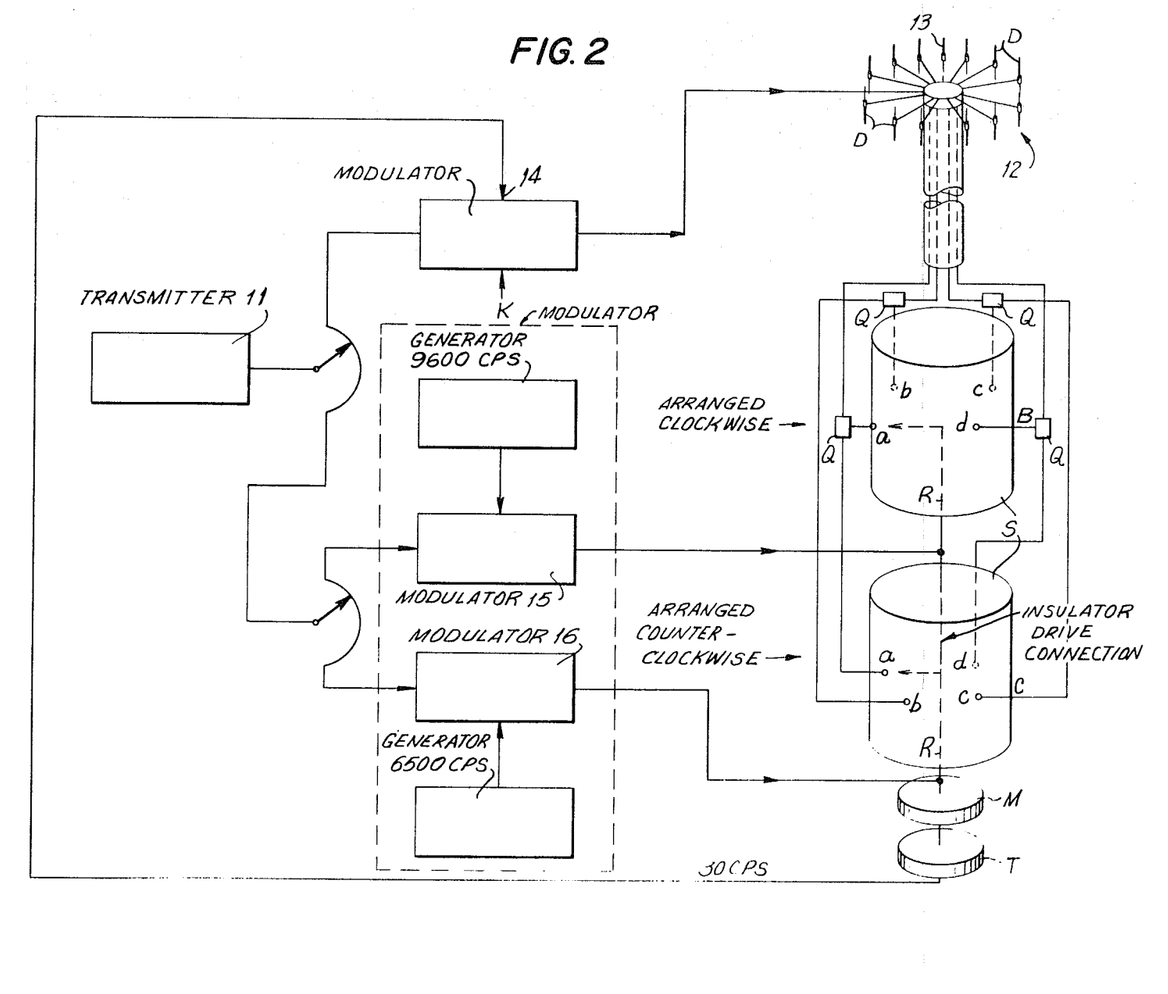
FIG. 2 is a schematic block diagram of an embodiment of a radio beacon system utilizing the system of the invention.

In a beacon system utilizing the system of the invention, it is possible to separately produce the first carrier frequency, as well as the second and third carrier frequencies, and to separately feed them to the various antennas in the proper phase relation. FIG. 2 illustrates a beacon system in which the second and third carrier wave energies are produced by modulation of portions of the transmitter energy with auxiliary carrier frequencies. The major portion of the energy of a transmitter 11 is fed to a carrier antenna 13 of a circular antenna system 12 consisting of a number of single antennas D. However, prior thereto, this RF energy is amplitude modulated in a modulator 14 with the reference signal of 30 cps, which is necessary for the removal of ambiguity and for compatibility with present VOR system. The reference signal is obtained in the conventional manner by a generator T from the actual or simulated gyration frequency of the circular antenna system 12. In the aforementioned modulator 14, it is still possible that at the point K a further intelligence carrier modulation is impressed upon the carrier.

A very small portion of the output of the transmitter 11, is modulated in single sideband suppressed carrier modulators 15 and 16 consisting of a combination of push-pull or any other conventional type of modulators such as, for example, variable reactances, Zener diodes.

The sideband energies are fed, for example, to two sets of metallic segments B and C arranged in opposite order from each other on a cylindrical stator of a rotating, capacitively coupled switch of the type described in U. S. Pat. No. 3,048,843, consisting of a stator S and a rotor R, where the sideband energies, due to rotation of the rotor R effected by a motor M, are coupled successively to all segments of the stator S, and are thus fed to two antennas of the circular array.

The switch is composed of a motor driven rotor containing a number of metallic segments according to the mode of desired scanning and a stator with metallic stator and collector segments respectively. The stator segments are connected to the antennas while the rotor segments are connected to the transmitter outputs.

The switch is modified, in any suitable manner known in the art, to rotate the two antennas of the circular array in opposite directions, as shown in FIG. 1. In accordance with the invention, one of the antennas is rotated in one direction and the other antenna is rotated in the opposite direction. Thus, one antenna is rotated in a clockwise direction and the other antenna is rotated in a counterclockwise direction.

As shown in FIG. 2, one set of stators is connected to the antennas in a clockwise fashion and the other set is connected to the antennas in a counterclockwise fashion. They are combined at each antenna in a matched manner by any of a number of methods well known in the art. Hybrid junctions Q may be used, so that the two feeds for the two oppositely rotating antennas can feed power to the antennas without interference or mismatch.

Accordingly, a receiver located at a remote receiving point of an omnidirectional radio beacon operating as described hereinbefore, will thus receive the carrier which is transmitted via the carrier antenna 13 and is amplitude modulated with the reference signal 30 cps, as well as the two sidebands, as produced by the modulation with the auxiliary carrier energies of, for example, 9960 cps and 6500 cps which are respectively transmitted simultaneously by two antennas D of the circular array. The receiver which cooperates with the beacon system receives a carrier wave modulated by 9960 cps and 6500 cps and 30 cps. At the receiving end, the three modulations of 30 cps, 9960 cps and 6500 cps are detected in the conventional manner and are separated by filters.

If the capacitively coupled switch of the transmitter, that is, the rotor R, is in rotation then, as is well known, at the voltage of the freqency of 9960 cps and 6500 cps, as obtained from the modulation of the carrier wave, is frequency modulated with the gyration or rotation frequency, and the phases of the LF voltage of 30 cps is equal to the gyration frequency of 30 cps, indicates the direction of propagation from the beacon as received by the receiver. The phase measuring indication is effected with the aid of one of the conventional metering and indicating arrangements. The receiving equipment corresponds to the conventional type of VOR receivers. Direction can be obtained by comparing the 30 cps phase of the frequency modulated 9960 cps as compared to the 30 cps phase of the amplitude modulated carrier. To obtain double precision, the phase of the 30 cps frequency modulated 9960 cps is compared to the phase of the 30 cps frequency modulated 6500 cps. Any 180° ambiguity is removed from the latter by the first comparison.

Figure 3:
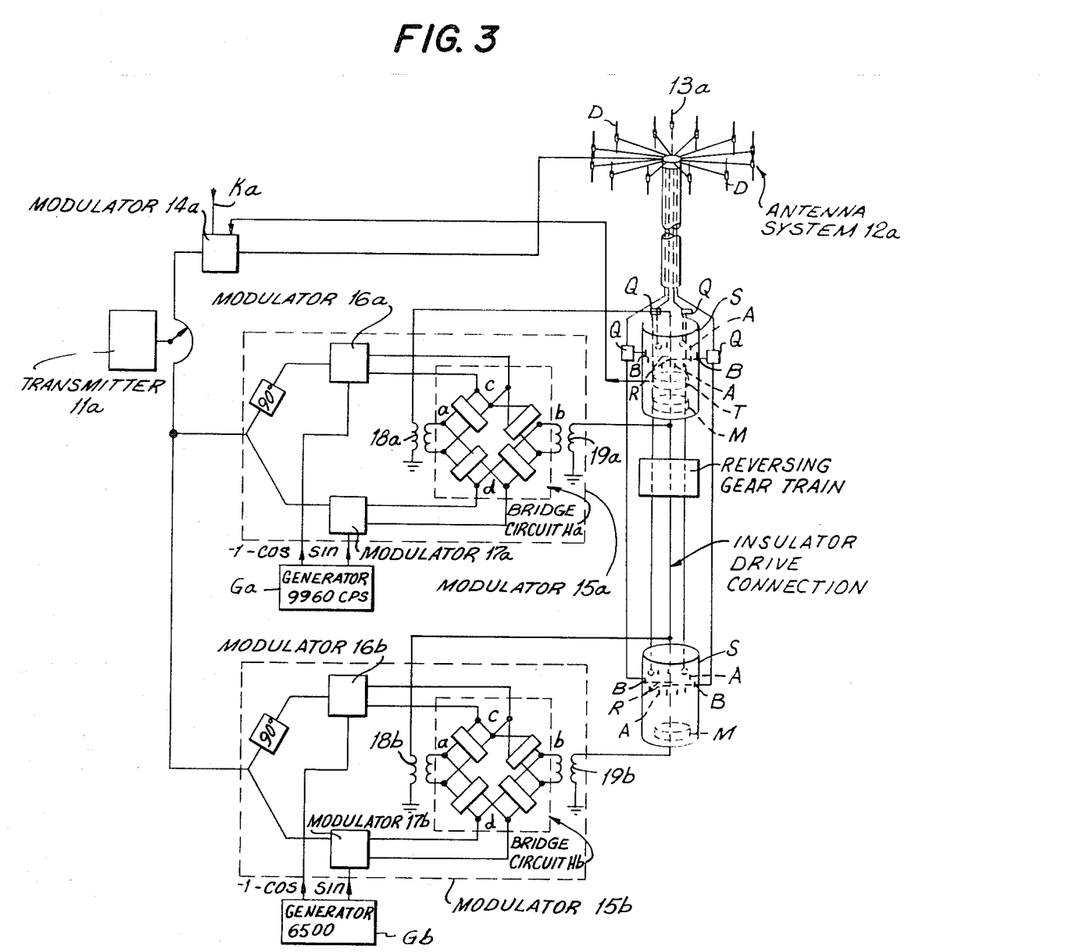
FIG. 3 is a schematic block diagram of another embodiment of a radio beacon system utilizing the system of the invention.

FIG. 3 shows a double sideband embodiment of the system of FIG. 2. Instead of using single antennas for the second and third antennas, two pairs of antennas are used where each pair consists of two antennas substantially diametrically opposite each other and on a circular perimeter of which the first antenna is the center of the circular array. This is substantially the type of antenna system included in a system of the type shown in FIG. 1 of U.S. Pat. No. 3,181,159. In FIG. 3, both the subcarriers 9960 cps and the 6500 cps are amplitude modulated on the carrier frequency and the subcarriers are frequency modulated by equivalent rotation in opposite directions.

The major portion of the energy of a transmitter 11a is fed to a carrier antenna 13a of a circular antenna system 12a consisting of a number of single antennas D. However, prior thereto, the RF energy is amplitude modulated in a modulator 14a with the reference signal of 30 cps which is necessary for the removal of the 180° ambiguity and for compatibility with the present VOR system. The reference system is obtained in the conventional manner by a generator T from the actual or simulated gyration frequency of the circular antenna system 12a. In the aforedescribed modulator 14a, it is still possible that at the point Ka a further intelligence carrier modulation is impressed on the carrier.

A very small portion of the output of the transmitter 11a is divided approximately in half and each half is amplitude modulated in each one of two modulators 15a and 15b consisting of a combination of push-pull or any other conventional types of moudlators such as, for example, variable reactances, Zener diodes. A bridge circuit Ha or Hb forms both the sum and difference outputs from the low frequency voltage of a generator Ga or Gb, for example, one low frequency voltage of 9960 and the other low frequency voltage 6500, in such a way that the modulation products are obtained in a pair of modulators 16a and 17a, and 16b and 17b and are fed to two diagonally opposing impedance points (c, d) of the bridge circuit Ha and Hb. At the two opposing points a and b, only the upper and lower sidebands, respectively, of each of the modulators may then be coupled out in the conventional manner with the aid of coupling arrangements 18a and 19a, and 18b and 19b.

The upper and lower sidebands of each of the modulators then have to be coupled into the circular array of antennas, so that one pair of antennas rotates in clockwise fashion and the other rotates in counterclockwise fashion. Each antenna of the circular array is connected to two similar stators of a rotating switch through a combiner Q which could be a hybrid coupler or a bridge arrangement to avoid mismatching the antennas. The two similar rotors of the cylindrical switch are then driven in opposite directions by means of the same motor and a gear train.

If the antennas are connected to one stator in a clockwise fashion and are connected to the other in a counterclockwise fashion, then the coupling rotors can be driven in the same direction by means of the single motor. Each of the pair of sideband energies are fed, for example, to two metallic segments B arranged opposite each other on one of the cylindrical rotors of the rotating capacitively coupled switch which may be of the type described in U.S. Pat. No. 3,048,843, consisting of stator S and rotor R, where each of the sideband energies, due to rotation of the rotor R effected by the motor M, are coupled successively to all segments of its particular stator S and are thus fed to two approximately diametrically opposite antennas of the circular array.

By using two sets of rotor segments and two sets of stator segments, and arranging the antenna connections as hereinbefore described, the two pairs of sideband energies are coupled into the cylindrical array of antennas so that one pair rotates in a clockwise direction and the other pair rotates in a counterclockwise rotation. The generation of sidebands and the simulated rotation of one set of sidebands in one direction and the simulated rotation of the other set of sidebands in the other direction can be accomplished by any other method known in the art.

By changing the relative RF phases of the sideband signal fed to a pair of rotors, the sideband frequency may phase, or frequency, modulate the carrier in space instead of amplitude modulate the carrier. If it were desired to leave the 9960 cps subcarrier as amplitude modulation it would be left as is. If it were desired to have the 6500 cps subcarrier modulate the signal as frequency modulation, one sideband fed to the rotor, for example, 18b or 19b, would be reversed in phase.

Figure 4:
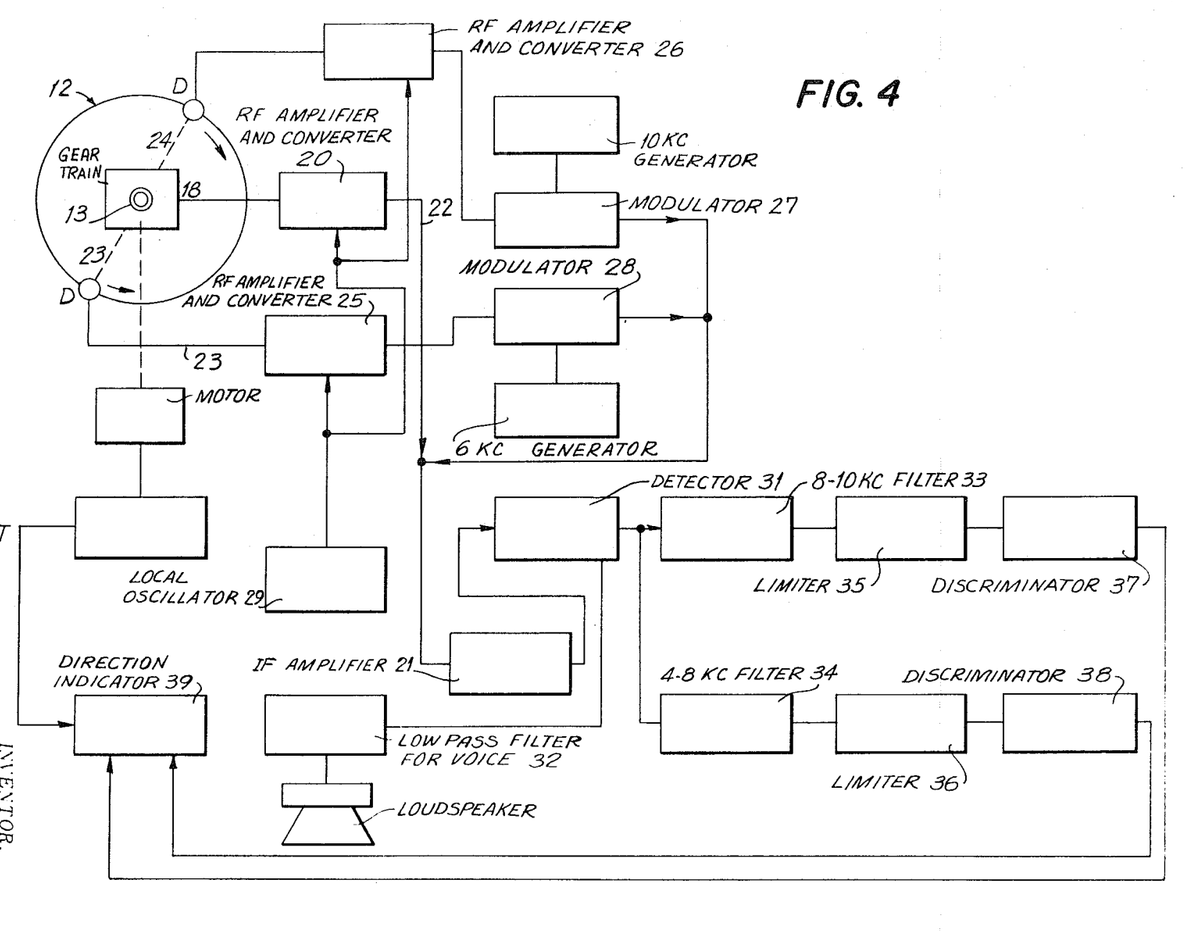
FIG. 4 is a schematic block diagram of an embodiment of a direction finder utilizing the system of the invention.

The practical application of the inventive idea to a direction finder cooperating with a transmitter without any directional modulation, is schematically shown in FIG. 4. The antenna system 12, comprising the single aerial 13 located at the center of the circular array, and the single antennas D arranged on the circular path, corresponds exactly to that as shown in FIG. 2. Likewise, the capacitively coupled switch, with the aid of which the antennas on the circular path are connected successively to the receiving equipment, exactly corresponds to that of FIG. 2. The capacitively coupled switch is driven by the motor M, as is denoted by the dashlined connection 10.

The energy received by the carrier antenna 13, single aerial located at the center of the circular array, is directly fed to the input of an RF amplifier and converter 20 and then to an IF amplifier 21 via a line 22. The energies which are respectively received by the two antennas D of the circular array are fed via lines 23 or 24, respectively, to the RF amplifier and converters 25 and 26 and then to modulators 27 and 28. The same local oscillator 29 is used for all three frequency converters 20, 25 and 26. The modulators 27 and 28 are single sideband suppressed carrier modulators yielding a frequency equal to the sum of the two input frequencies. The three RF amplifiers are tracked, although it is not important that they track perfectly, since it is frequency modulation which will be detected in the receiver.

The carrier IF from the RF amplifier and converter 20 and the two sidebands from the single sideband suppressed carrier modulators 27 and 28 are combined and fed to the single IF amplifier 21 and then to a detector 31. The output of the detector 31 is divided into three parts by a low pass filter 32 for voice, a 8–12 kc filter 33 for one LF voltage and a 4–8 kc filter 34 for the other LF voltage. The LF voltages are obtained by using limiters 35 and 36 and discriminators 37 and 38 to detect the frequency modulation generated by the rotation of the two antennas.

A direction indicator 39 is used to compare the LF voltage of one discriminator 37 or 38 in an indicator with the LF voltage generated by the motor at T. This resolves any 180° ambiguity that might be obtained when direction is obtained by comparing the LF voltages obtained at the outputs of the discriminators 37 and 38 in the direction indicator 39. The two LF voltages are generated as frequency modulation of the received signal of the inputs to the converters 25 and 26 by the rotation of the two antennas in opposite directions in the circular array 12.

Figure 5:
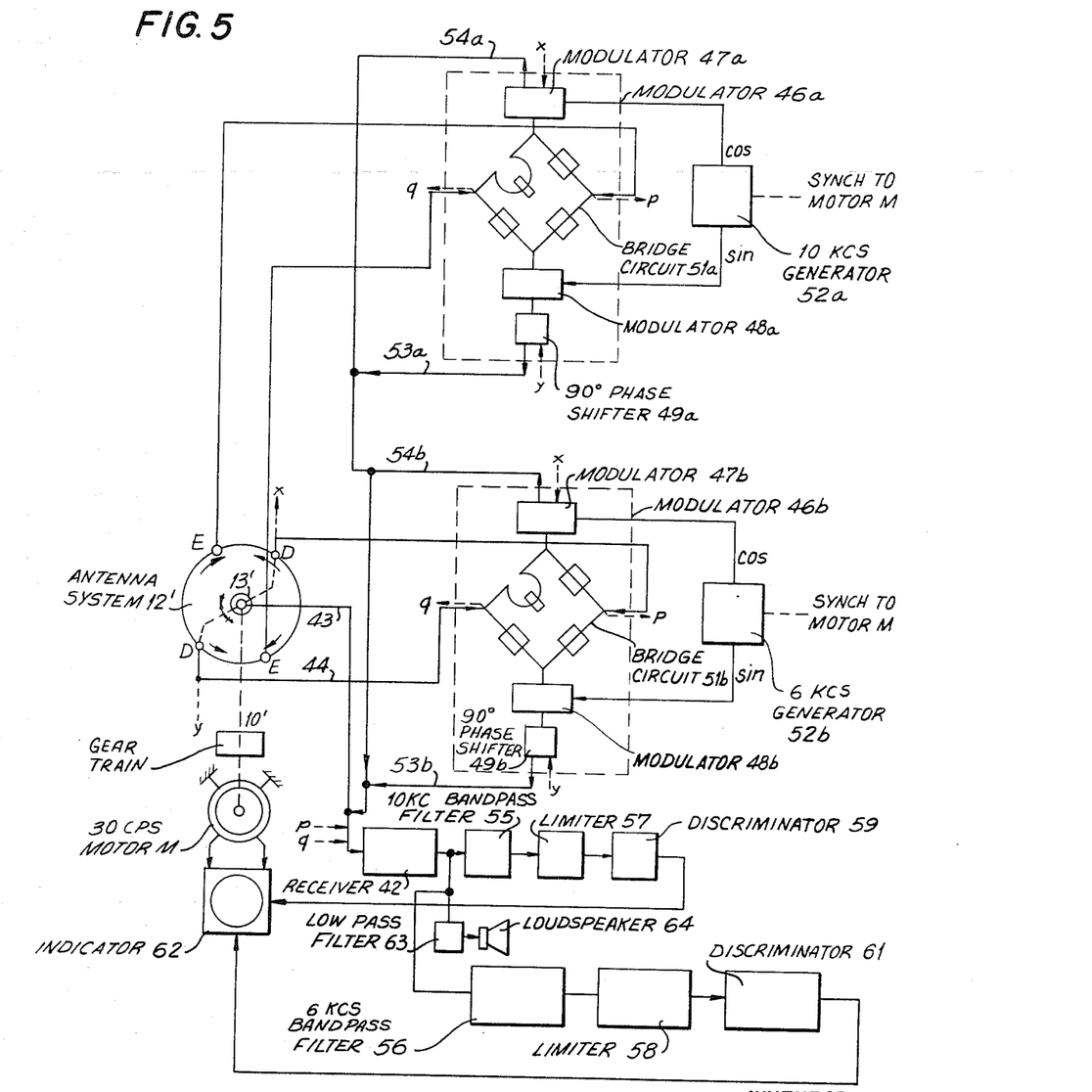
FIG. 5 is a schematic block diagram of another embodiment of a direction finder utilizing the system of the invention.

FIG. 5 shows a similar embodiment of the direction finder of FIG. 4, but instead of using a converter and single sideband suppressed carrier modulator with single rotating antennas, two pairs of antennas are rotated in opposite directions, as shown in FIG. 3. The antenna system 12', comprising the single antenna 13' located at the center of the circular array and the antenna pairs D and E arranged on the circular path corresponds exactly to the equivalent pairs of antennas shown in FIG. 3. Likewise, the capacitively coupled switch, with the aid of which the two pairs of antennas on the circular path are connected successively to the receiving equipment, exactly corresponds to that of FIG. 3. The capacitively coupled switch is driven by the motor M as is denoted by the dashed line connection 10'.

The energy received by the carrier antenna 13', which is a single antenna located at the center of the circular array, is directly fed to the input of a receiver 42 via a line 43. The energies which are respectively received by each pair of antennas D and E are treated similarly. The energy received by the antenna pair D is fed via lines 44 and 45 to modulator 46b, and the energy received by antenna pair E is fed via lines 65 and 66 to modulator 46a. Each of the modulator arrangements 46a and 46b substantially consists of two modulators 47a and 48a, and 47b and 48b, the modulators 48a and 48b being either followed or preceded by a 90° phase shifting device 49a and 49b, respectively, and by a bridge circuit 51a and 51b, respectively, consisting of impedances, of which the two opposing points lead into the corresponding modulator 47a or 48a, or 47b or 48b, respectively.

In the position indicated by the solid line in FIG. 5, the lines 44 and 45 lead to two oppositely arranged points of the bridge circuit. Accordingly, in this case, the modulators 46a and 46b are operated in a reversed manner to that of the modulators 15a and 15b of FIG. 3. It can be proved that this has no influence upon the function or operation of the system. Furthermore, the energies or powers received by the antennas, denoted by the dash lines at points x and y at the antennas and at the modulators, can be first led into the modulators, and the sidebands can be coupled out at oppositely arranged points of the bridge circuit, as denoted by the dashlines p and q at the inlet of the receiver. In this case, the function of the modulators 46a and 46b, as indicated by the dash lines, will exactly correspond to that of the arrangements 15a and 15b in FIG. 3.

The modulators 47a and 48a, and 47b and 48b are also fed with two orthogonally related voltages of the auxiliary carrier frequency such as, for example, 10 kcs, from generator 52a. On account of this, and in the conventional manner, there are produced at the output of the modulators on lines 53a or 54a, or 53b or 54b, respectively, the sidebands as modulation products of the energy as received by the antennas of the circular array and of the auxiliary carrier energy. Together with the energy of the first carrier as received by the carrier antenna and the converted energies from antenna pair E they are fed to the input of the receiver 42.

The energies received by antenna pair E which effectively rotate in an opposite direction from the antenna pair D are also modulated in a similar manner by the modulators and are combined in the bridge circuit, except that the auxiliary carrier frequency is different, for example, by 4 kcs between the generators 52a and 52b. In the receiver 42 this will have an effect as if there would have been received a carrier wave amplitude modulated with the frequencies of the two auxiliary carrier waves. By the rotation of the switch, or, respectively, by the actual or simulated rotation of the antenna pairs D and E on the circular path, the auxiliary carrier frequencies, subsequently to the demodulation, are frequency modulated with the gyration frequency.

The LF voltage of the frequency of the auxiliary carriers (10 kcs and 6 kcs) as appearing at the output of the receiver 42, is fed via band pair filters 55 and 56 not permitting the passage of intelligence modulation of the carrier frequency, to limiters 57 and 58, and are thereupon demodulated in frequency demodulators or discriminators 59 and 61. The LF voltage appearing at the output of the demodulators 59 and 61, the phases of which when compared with a reference signal obtained from a generator T, which is synchronized with the rotation or gyration frequency of the switch, indicates the direction of incidence of the wave front and eliminates the 180° ambiguity. This comparison is provided by a phase metering and indicating device 62 of conventional type. Any possible intelligence modulation of the carrier can be filtered out at the output of the receiver 42 via a low pass filter 63 and can be made audible with the aid of a loudspeaker 64.

Figure 6:
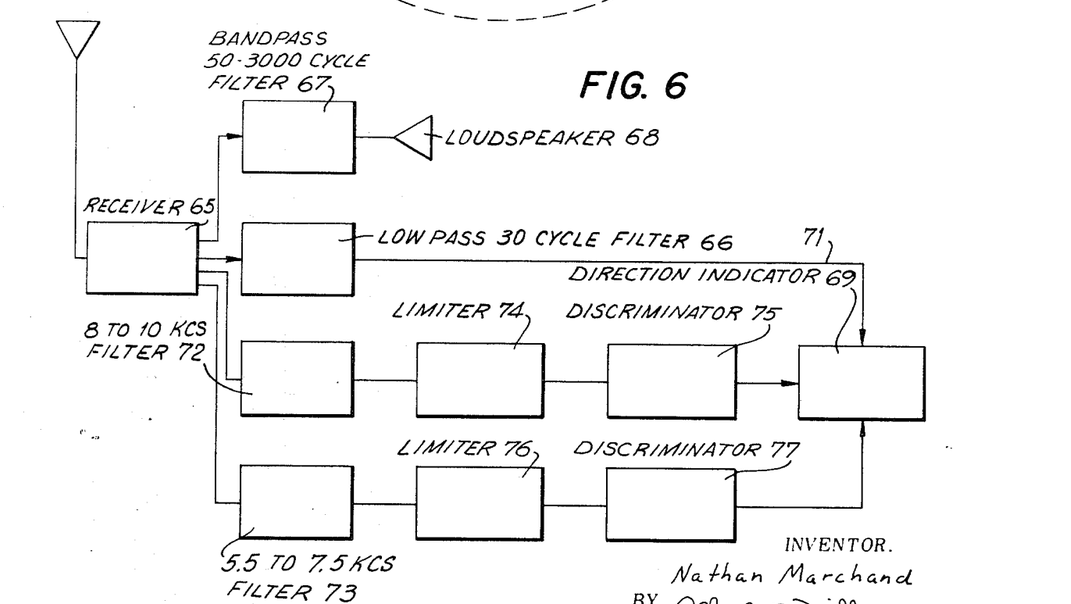
FIG. 6 is a schematic block diagram of an embodiment of a DPVOR receiver utilizing the system of the invention.

FIGS. 2 and 3 show the realization of the invention in the transmitting domain, while FIGS. 4 and 5 show the realization of the invention in the receiving domain, as a direction finder. In FIG. 3, the receiver can be a conventional VOR receiver, modified to take advantage of the DPVOR by including a filter to remove the 6.5 kc FM signal and demodulate it, as shown in FIG. 6. The normal VOR receiver consists of a receiver 65 with a low pass 30 cycle filter 66 and a bandpass filter 67 and demodulator for the 9960 cps. Direction is obtained by comparing the phase of the 30 cycle signal with the 30 cycle demodulated 9960 cps FM signal. This is then used in a DPVOR to obtain a first approximate VOR direction. Then, by comparing the phases of the 30 cycle demodulated 9960 cps FM signal with the 30 cycle demodulated 6,500 cps FM signal, the precise direction is obtained. Any ambiguity is removed by the first reading. In effect, only the second reading is necessary for direction and the first comparison merely removes the 180° ambiguity.

Thus, in FIG. 6, the receiver 65 is connected to the bandpass filter 67 and said filter is connected to a loudspeaker 68. The receiver 65 is connected to the input of the low pass 30 cycle filter 66 and the output of said filter is connected to an input of a direction indicator 69 via a lead 71. The receiver 65 is connected to the input of a 9960 cps, 8 to 10 kcs filter 72 and to the input of a 6500 cps 5.5 to 7.5 kcs filter 73.

The output of the filter 72 is connected to the input of a limiter 74 and the output of said limiter is connected to the input of a discriminator 75. The output of the discriminator 75 is connected to a second input of the direction indicator 69. The output of the filter 73 is connected to the input of a limiter 76 and the output of said limiter is connected to the input of a discriminator 77. The output of the discriminator 77 is connected to a third input of the direction indicator 69.

While the invention has been described by means of specific examples and in specific embodiments, we do not wish to be limited thereto, for obvious modifications will occur to those skilled in the art without departing from the spirit and scope of the invention.

I claim:

1. In an omnidirectional radio bearing system utilizing the Doppler principle, an antenna system comprising
   a circular antenna array including a first antenna and second and third antennas arranged around the first antenna on a circular perimeter of which the first antenna constitutes the center of the circular array; and
   rotating means for generating a frequency modulation in the signals associated with the second and third antennas characteristic of a rotational condition of said second and third antennas on the perimeter at a low frequency in a manner whereby said second and third antennas are rotated in opposite directions around said perimeter to provide a phase difference in electrical degrees in the modulation frequency of the signals which is double the actual displacement in azimuth degrees, the signals associated with the first antenna being unaffected by the frequency modulation.

2. An antenna system as claimed in claim 1, wherein the second antenna is a 9960 cps subcarrier antenna which is rotated at 30 cps in one of a clockwise and counterclockwise direction and the third antenna is a subcarrier antenna between 4 and 8 kcs which is rotated at 30 cps in the other of a clockwise and counterclockwise direction.

3. An antenna system as claimed in claim 2, wherein the second antenna is rotated in a counterclockwise direction so that the 30 cps signal modulated on the 9960 cps subcarrier arrives earlier in phase when the direction of reception moves in a clockwise direction and the third antenna is rotated in a clockwise direction so that the 30 cps signal modulated on the 4 to 8 kcs subcarrier arrives later in phase.

4. The antenna system as claimed in claim 2, wherein the Doppler signal at the second antenna is 9960 ± 480 cps and the Doppler signal at the third antenna is between 4 and 8 kcs ± 480 cps and the phase difference in electrical degrees between the 30 cps modulation signals is double the actual displacement in azimuth degrees, one signal advancing in phase and the other signal being retarded equally in phase with azimuth.

5. An omnidirectional radio bearing system comprising
a transmitter including means for producing two oppositely rotating Doppler generated frequencies and an omnidirectional antenna modulated by a reference frequency equal to the rates of rotation; and
a receiver for receiving the three signals produced by the transmitter and including rough indicating means for providing a rough indication of the direction of reception by utilizing one Doppler signal and the omnidirectional reference frequency and indicating means for providing a fine indication of the direction of reception by comparing the two received frequency modulated Doppler signals.

6. An omnidirectional radio bearing system comprising
a beacon transmitter which transmits a carrier with amplitude modulated low frequency voltage reference signals and two subcarriers frequency modulated with low frequency voltages at the same frequency which vary in phase according to the direction of reception from the transmitter, one of the low frequency voltages increasing in phase and another decreasing in phase; and
a receiver for receiving signals from the transmitter, said receiver including comparing means for comparing the phases of the two low frequency voltages modulating the subcarriers to provide the precise direction of reception and additional comparing means for removing 180° ambiguity by comparing the phase of one of the low frequency voltages modulating one of the subcarriers with the phase of the low frequency voltage modulating the carrier.

7. An omnidirectional radio bearing system as claimed in claim 6, wherein the transmitter includes antenna means for producing two double sideband signals rotating in opposite directions.

8. An omnidirectional radio bearing system as claimed in claim 6, wherein the transmitter includes antenna means for producing two double sideband signals rotating in opposite directions and wherein one subcarrier is amplitude modulated on the carrier and the other subcarrier is frequency modulated on the subcarrier and the low frequency voltage reference signal is amplitude modulated on the carrier by adjusting the relative phases of each of the double sideband signals.

9. An omnidirectional radio bearing system as claimed in claim 8, wherein the carrier is amplitude modulated by a 30 cps low frequency signal, a subcarrier is 9960 cps and is frequency modulated by a 30 cps low frequency signal and is amplitude modulated on the carrier, and another subcarrier is between 4 and 8 kcs and is frequency modulated by a 30 cps low frequency signal of opposite phase and is frequency modulated on the carrier.

10. An omnidirectional radio bearing system as claimed in claim 9, wherein the comparing means compares the phases of two 30 cps low frequency voltages modulating the carriers, and the additional comparing means removes 180° ambiguity by comparing the phases of one 30 cps low frequency voltage modulating a subcarrier with the phase of a 30 cps low frequency voltage amplitude modulating the carrier.

* * * * *

UNITED STATES PATENT OFFICE
CERTIFICATE OF CORRECTION

Patent No. 3,778,831                Dated December 11, 1973

Inventor(s) Nathan Marchand

It is certified that error appears in the above-identified patent and that said Letters Patent are hereby corrected as shown below:

Claim 10, lines 5-6, "phases" should be --phase--.

Signed and sealed this 16th day of April 1974.

(SEAL)
Attest:

EDWARD M. FLETCHER, JR.　　　　　　　C. MARSHALL DANN
Attesting Officer　　　　　　　　　　Commissioner of Patents